US010952365B2

(12) United States Patent
Taylor et al.

(10) Patent No.: US 10,952,365 B2
(45) Date of Patent: Mar. 23, 2021

(54) CONTROL UNITS, NODES, SYSTEM, AND METHOD FOR TRANSMITTING AND COMMUNICATING DATA

(71) Applicant: Kinze Manufacturing, Inc., Williamsburg, IA (US)

(72) Inventors: Max Taylor, Williamsburg, IA (US); Ryan Legge, Cedar Rapids, IA (US); Matthew J. Wilhelmi, Parnell, IA (US); Dustan Hahn, Williamsburg, IA (US); Jamie Shults, North Liberty, IA (US); Ryan Taylor, Cedar Rapids, IA (US); Jason Schoon, North Liberty, IA (US); Kelly Minton, Marion, IA (US); Ryan McMahan, Cedar Rapids, IA (US); Matthew Moeller, North Liberty, IA (US); Will Whiteman, Coralville, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 132 days.

(21) Appl. No.: 15/800,954

(22) Filed: Nov. 1, 2017

(65) Prior Publication Data

US 2018/0116102 A1 May 3, 2018

Related U.S. Application Data

(60) Provisional application No. 62/415,909, filed on Nov. 1, 2016, provisional application No. 62/461,275, filed on Feb. 21, 2017.

(51) Int. Cl.
*A01C 7/10* (2006.01)
*A01B 69/00* (2006.01)
(Continued)

(52) U.S. Cl.
CPC .............. *A01C 7/105* (2013.01); *A01B 59/00* (2013.01); *A01B 69/004* (2013.01); *A01C 7/205* (2013.01);
(Continued)

(58) Field of Classification Search
USPC ......................................................... 701/50
See application file for complete search history.

(56) References Cited

U.S. PATENT DOCUMENTS

| 4,149,163 A | 4/1979 | Fathauer |
| 4,841,773 A * | 6/1989 | Stewart ................. G01C 19/00 73/504.04 |

(Continued)

FOREIGN PATENT DOCUMENTS

| EP | 2132971 A1 | 12/2009 |
| FR | 2856164 A1 | 12/2004 |

OTHER PUBLICATIONS

InvenSense, 9 Axis Motion Tracking, pp. 1-5. Aug. 9, 2017.
(Continued)

*Primary Examiner* — Jean Paul Cass
(74) *Attorney, Agent, or Firm* — McKee, Voorhees & Sease, PLC

(57) ABSTRACT

Agricultural electronics include many components. The components can be connected via an electronic link that connects the various components to components of an agricultural implement. This can include the use of a component type identifier and a master module. The identifier and the module can communicate data, including identification data and instructional data, to easily acknowledge and operate various electrical components of the agricultural implement. Additional sensors can be included to provide even additional data that is communicated between the module and the components of the agricultural implement to
(Continued)

aid in providing instructions for operation and to provide additional data information.

20 Claims, 12 Drawing Sheets

(51) Int. Cl.
    *A01C 7/20*     (2006.01)
    *G06F 13/00*     (2006.01)
    *A01B 59/00*     (2006.01)
    *E02F 9/26*     (2006.01)
    *A01C 21/00*     (2006.01)

(52) U.S. Cl.
    CPC ............ *G06F 13/00* (2013.01); *A01C 21/005* (2013.01); *E02F 9/265* (2013.01)

(56) References Cited

U.S. PATENT DOCUMENTS

| | | | |
|---|---|---|---|
| 5,260,875 A | 11/1993 | Tofte et al. | |
| 5,621,666 A | 4/1997 | O-Neall et al. | |
| 5,924,371 A * | 7/1999 | Flamme | A01B 79/005 111/177 |
| 6,070,539 A * | 6/2000 | Flamme | A01B 79/005 111/177 |
| 6,079,340 A * | 6/2000 | Flamme | A01B 79/005 111/178 |
| 6,112,839 A * | 9/2000 | Ostler | B60K 25/00 172/2 |
| 6,141,612 A * | 10/2000 | Flamme | A01B 63/1117 111/177 |
| 6,198,986 B1 * | 3/2001 | McQuinn | A01C 7/102 700/242 |
| 6,223,110 B1 * | 4/2001 | Rowe | E02F 3/435 111/177 |
| 6,285,938 B1 * | 9/2001 | Lang | A01C 7/102 701/50 |
| 6,377,881 B1 * | 4/2002 | Mullins | A01B 69/008 172/2 |
| 6,522,948 B1 * | 2/2003 | Benneweis | A01B 79/005 700/243 |
| 6,571,190 B2 * | 5/2003 | Hou | G01L 25/00 702/105 |
| 7,370,589 B2 * | 5/2008 | Wilkerson | A01C 7/06 111/127 |
| 7,725,294 B2 * | 5/2010 | Mindeman | G05B 19/042 701/31.4 |
| 7,726,251 B1 * | 6/2010 | Peterson | A01C 7/046 111/185 |
| 8,065,062 B2 * | 11/2011 | Prebeck | F16H 59/00 701/50 |
| 8,141,504 B2 * | 3/2012 | Dean | A01C 7/081 111/179 |
| 8,321,061 B2 * | 11/2012 | Anderson | A01G 25/00 700/284 |
| 8,321,365 B2 * | 11/2012 | Anderson | G06N 5/02 706/46 |
| 8,322,072 B2 * | 12/2012 | Anderson | A01G 25/167 47/48.5 |
| 8,437,879 B2 * | 5/2013 | Anderson | G06Q 10/06 700/284 |
| 8,504,234 B2 * | 8/2013 | Anderson | G06N 5/04 701/24 |
| 8,948,976 B1 * | 2/2015 | Unruh | A01C 21/005 701/50 |
| 9,076,105 B2 * | 7/2015 | Anderson | G06N 5/04 |
| 9,121,145 B2 * | 9/2015 | Berning | E01C 23/088 |
| 9,226,442 B2 * | 1/2016 | Grimm | A01C 7/06 |
| 9,324,197 B2 * | 4/2016 | Gelinske | A01C 7/081 |
| 9,330,062 B2 * | 5/2016 | Thurow | G06F 17/00 |
| 9,489,774 B2 * | 11/2016 | Kruglick | G06F 3/04815 |
| 9,629,308 B2 * | 4/2017 | Scholer | G01F 1/662 |
| 9,631,964 B2 * | 4/2017 | Gelinske | G01F 1/666 |
| 9,655,355 B2 * | 5/2017 | Brooks | A01C 21/002 |
| 9,661,805 B1 * | 5/2017 | Conrad | A01C 7/044 |
| 9,745,094 B2 * | 8/2017 | Farris | B65B 69/0008 |
| 9,763,381 B2 * | 9/2017 | Grimm | A01C 7/06 |
| 9,836,652 B2 * | 12/2017 | Lection | G06T 11/00 |
| 9,854,732 B2 * | 1/2018 | Thompson | A01C 7/081 |
| 9,894,829 B2 * | 2/2018 | Shivak | A01C 7/04 |
| 9,936,916 B2 * | 4/2018 | Sahin | A61B 5/0022 |
| 10,085,379 B2 * | 10/2018 | Schleusner | G06K 9/00114 |
| 10,104,824 B2 * | 10/2018 | Blackwell | A01B 59/002 |
| 10,200,524 B2 * | 2/2019 | Stock | G04G 17/045 |
| 10,405,786 B2 * | 9/2019 | Sahin | A61B 5/165 |
| 2008/0148630 A1 * | 6/2008 | Ryan | A01G 7/045 47/17 |
| 2009/0118910 A1 | 5/2009 | Carr et al. | |
| 2010/0250023 A1 * | 9/2010 | Gudat | E02F 9/2045 701/2 |
| 2012/0089304 A1 * | 4/2012 | Hamilton | A01B 79/005 701/50 |
| 2013/0104785 A1 | 5/2013 | Achen et al. | |
| 2014/0039936 A1 * | 2/2014 | Da Victoria Lobo | G06Q 40/08 705/4 |
| 2014/0116341 A1 * | 5/2014 | Kopic | A01K 29/00 119/14.02 |
| 2014/0225977 A1 * | 8/2014 | Vilcovsky | G06Q 30/00 348/14.07 |
| 2014/0225978 A1 * | 8/2014 | Saban | G09F 19/16 348/14.07 |
| 2014/0226000 A1 * | 8/2014 | Vilcovsky | G06F 3/017 348/77 |
| 2014/0226900 A1 * | 8/2014 | Saban | G02B 5/08 382/165 |
| 2014/0267410 A1 * | 9/2014 | Fein | G06T 11/00 345/633 |
| 2014/0267411 A1 * | 9/2014 | Fein | G06T 11/00 345/633 |
| 2014/0343806 A1 | 11/2014 | Kuhnel et al. | |
| 2015/0143221 A1 * | 5/2015 | Ahuja | H04L 9/32 715/230 |
| 2015/0143234 A1 * | 5/2015 | Norris, III | G06F 40/166 715/256 |
| 2015/0234767 A1 * | 8/2015 | Tatge | G06F 13/4027 710/306 |
| 2016/0012465 A1 * | 1/2016 | Sharp | G06Q 20/384 705/14.17 |
| 2016/0048606 A1 * | 2/2016 | Rubinstein | H04N 21/47217 715/234 |
| 2016/0127710 A1 * | 5/2016 | Saban | G06T 11/00 386/241 |
| 2016/0252615 A1 | 9/2016 | O'Sullivan et al. | |
| 2017/0090196 A1 * | 3/2017 | Hendron | G02B 27/0101 |
| 2017/0154366 A1 * | 6/2017 | Turgeman | G06Q 30/0277 |
| 2017/0228847 A1 * | 8/2017 | Eberlein | G06Q 10/0635 |
| 2019/0051100 A1 * | 2/2019 | Russ | G07F 17/3244 |
| 2019/0051101 A1 * | 2/2019 | Russ | G06T 13/40 |
| 2019/0051103 A1 * | 2/2019 | Russ | G07F 17/3258 |
| 2019/0113973 A1 * | 4/2019 | Coleman | A61B 5/165 |

OTHER PUBLICATIONS

"The International Search Report and Written Opinion of the International Searching Authority", in connection with PCT/US17/59558 filed Nov. 1, 2017, pp. 1-12, dated Jan. 9, 2018.

* cited by examiner

CONTROL UNITS, NODES, SYSTEM, AND METHOD FOR TRANSMITTING AND COMMUNICATING DATA

CROSS-REFERENCE TO RELATED APPLICATIONS

This application claims priority under 35 U.S.C. § 119 to U.S. Provisional Application Ser. No. 62/415,909, filed on Nov. 1, 2016, and U.S. Provisional Application Ser. No. 62/461,275, filed on Feb. 21, 2017, the contents of all are hereby incorporated by reference in their entirety and for all purposes.

FIELD OF THE INVENTION

The disclosure includes methods, systems, and apparatus for acquiring, storing, receiving, communicating, and configuring information related to an agricultural implement and performing instructions, operations, and other outputs based upon the same.

BACKGROUND OF THE INVENTION

Agricultural implements perform a variety of agricultural operations. For example, an agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing, a seed disk, and a seed chute. The housing is constructed such that it creates a reservoir to hold a seed pool. The seed disk resides within the housing and rotates about a generally horizontal central axis. As the seed disk rotates, it passes through the seed pool where it picks up individual seeds. The seeds are subsequently dispensed into the seed chute where they drop into the seed furrow. The seed meters are given a location along a toolbar of a planter, and the location determines at least some functionality of the meter.

Other areas of a planter include the uses of actuators (hydraulic, pneumatic, electric, or combination), lighting systems, fan systems, vacuums, sensors, location systems, and other systems that are able to control a function of the planter.

As the components of implements such as planters become more electronic, the control of the components and the setup of the same becomes more difficult. This is due, in part, to the variability of the location and functionality of the components. Problems can include wiring requirements (additional costs, unpleasant aesthetics, hardware limitations, etc.), initial and ongoing setups, diagnosis, and issues related to a change of one or more of the components. Still further, the increasing number of electronics requires increased requirements for speed and bandwidth to communicate instructions to and from components, as well as any data that is acquired as part of the functionality and/or operation of the planter.

Therefore, there is a need in the art for improved methods, systems, and apparatus on or in use with an agricultural implement that will allow for the operation of the implement configured with electronic and other intelligent controls.

SUMMARY OF THE INVENTION

It is therefore a primary object, feature, and/or advantage of the disclosure to overcome and/or improve on issues in the art.

It is another object, feature, and/or advantage of the disclosure to provide a high speed, high bandwidth system for transmitting information to, from, and within an agricultural implement.

It is yet another object, feature, and/or advantage for an agricultural implement to include a processing unit embedded thereto to include information related to the implement.

It is still another object, feature, and/or advantage to provide intelligent implement nodes to provide control and data communication for sensors, motors, cameras, lights, actuators, fans, and any other device linked to the implement network.

It is a further object, feature, and/or advantage to include intelligent implement positioning apparatus and/or systems to acquire and maintain information related to the positioning of the implement and/or a portion thereof.

It is still a further object, feature, and/or advantage of the disclosure to provide the ability to automatically recognize, detect, read, program, or other interact with a change made to an implement.

It is yet a further object, feature, and/or advantage to allow communication between multiple implements and/or tow vehicles.

It is still another object, feature, and/or advantage to acquire, store, transmit, communicate, and/or utilize data associated with one or more operations performed by the agricultural implement.

It is yet another object, feature, and/or advantage of the disclosure to provide rugged components with input/output (I/O) connectivity that transmits data associated with industrial, agricultural, commercial, and/or personal activities.

These and/or other objects, features, and advantages of the invention will be apparent to those skilled in the art. The invention is not to be limited to or by these objects, features and advantages. No single embodiment need provide each and every object, feature, or advantage.

According to aspects of the disclosure, a method for connecting an electronic component with an agricultural implement configured to perform an agricultural operation is provided, and includes providing the electronic component having a component type identifier; providing a planter having a plurality of row unit slots and a master module, and an electronic link configured to connect to the electronic component to the agricultural implement; automatically detecting an electronic connection from the electronic component via the electronic link; transmitting the component type identifier to the master module to identify the connected electronic component; and providing operating instructions to the electronic component based, as least in part, on the component type identifier.

According to some embodiments, the method includes wherein the connected electronic component comprises one of a seed meter assembly and a row unit assembly.

According to additional embodiments, the method includes wherein the connected electronic component is the row unit assembly, and the method further comprising the steps of: determining one of the plurality of row unit slots associated with the row unit assembly; configuring the row unit assembly to perform a portion of the agricultural operation associated with the one of the plurality of row unit slots.

According to other embodiments, the method includes wherein the electronic link comprises one of a wired connection or a wireless connection.

According to still other embodiments, the method includes wherein the master module is associated with an electronic user interface.

According to further embodiments, the method includes wherein the component type identifier is stored as data on the electronic component.

According to other embodiments, the method includes further comprising the step of determining the operating instructions for the row unit assembly based, at least in part, on a preset map.

According to additional aspects of the disclosure, a system for connecting an electronic component to an agricultural implement is provided, and includes an electronic link configured to electronically connect the electronic component and the agricultural implement; a component type identifier stored as data associated with the electronic component; and a master module configured to: (a) detect the presence of the electronic component connected to the agricultural implement; (b) identify one or more characteristics of the electronic component based, at least in part, on the component type identifier; (c) determining operating instructions associated with the electronic component based, at least in part, on the one or more characteristics of the electronic component; and (d) provide the operating instructions to the electronic component via the electronic link.

According some embodiments, the system includes wherein the one or more characteristics comprise a type of the electronic component or a location of the electronic component on the agricultural implement.

According some additional embodiments, the system includes wherein the electronic component is a row unit assembly on a planter implement.

According some further embodiments, the system includes wherein the planter implement includes a plurality of row units each having unique planting parameters; wherein the row unit assembly is operably connected to one of the plurality of row units; wherein the master module, upon detection of the row unit assembly, automatically configures the row unit assembly to perform the unique planting parameters associated with one of the plurality of row units.

According some embodiments, the system includes wherein the operating instructions include seed placement data associated with a prescriptive planting map.

According some embodiments, the system includes wherein the electronic link comprises one of a wired connection and a wireless connection.

According some embodiments, the system further comprises: measurement sensors associated with the planter and each of the plurality of row units; wherein the measurement sensors are configured to synchronize time and location with one another.

According to still additional aspects of the disclosure, an agricultural planter with a plurality of electronic components is provided, and includes a routing member comprising a memory including data associated with the agricultural planter and a plurality of connectors; a plurality of nodes electrically coupled to the routing member, each of the plurality of nodes associated with at least one of the electronic components of the agricultural planter; wherein the plurality of nodes electronically communicates with the routing member to associate, in real time, the electronic component with the agricultural planter to perform a function based, at least in part, on the data associated with the agricultural planter and stored in the member of the routing member.

According some embodiments, the planter includes wherein the routing member and the plurality of nodes are hardwired connected.

According some embodiments, the planter includes wherein the routing member and the plurality of nodes are wirelessly connected.

According some embodiments, the planter further comprises at least one display electronically connected to the routing member, said display configured to display information related to the plurality of nodes and associated electronic components.

According some embodiments, the planter further comprises at least one position sensor electronically connected to at least one of the plurality of nodes, wherein said at least one position sensor provides positional data associated with the agricultural planter.

According some embodiments, the planter includes wherein the at least one position sensor comprises a processor and a 9-axis inertial measurement sensor.

Figure 1:
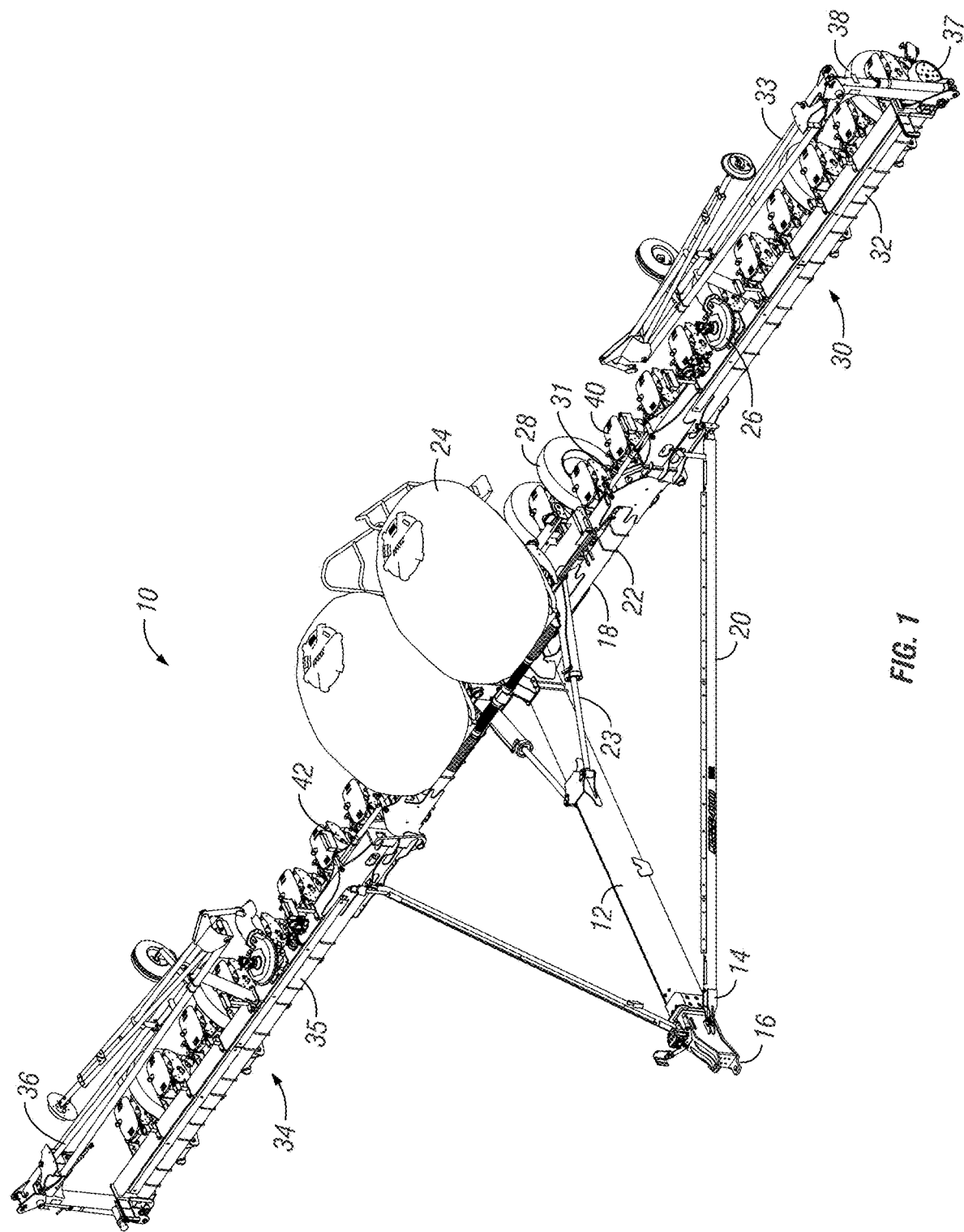
FIG. 1 is a perspective view of an agricultural planter.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 is a perspective view of a planter 10. While a planter 10 is shown in the figure, it is to be appreciated that the present disclosure can be used with various agricultural implements. Even further, it is to be appreciated that aspects of the present disclosure can be used on or with other products outside of the agricultural realm. For example, the disclosure will include aspects that can be used generally in many different industries, including but not limited to, hydraulic actuator applications, heavy equipment controls, industrial automation, refrigeration, remote monitoring and control, entertainment industry, welding, general robotics, alternative energy source control, municipal control, traffic light and camera control, automotive control, and generally any other industry similar or dissimilar to those disclosed. As will be appreciated, the aspects of the disclosure will provide for the ability to support internet of things (IoT) and other environments in which information, data, or the like is transmitted efficiently with higher speed and higher bandwidth.

Figure 10:
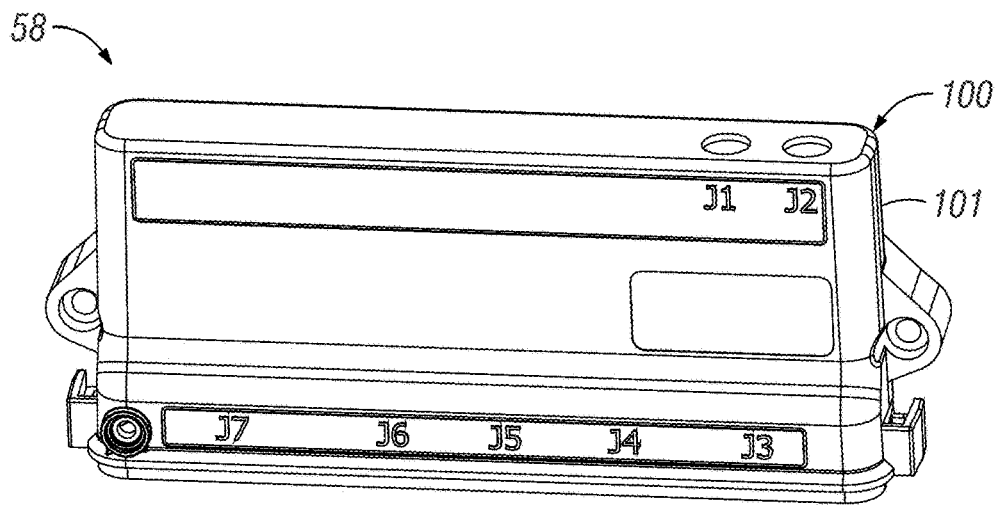
FIG. 10 is an exploded view of the IIN.
Figure 10:
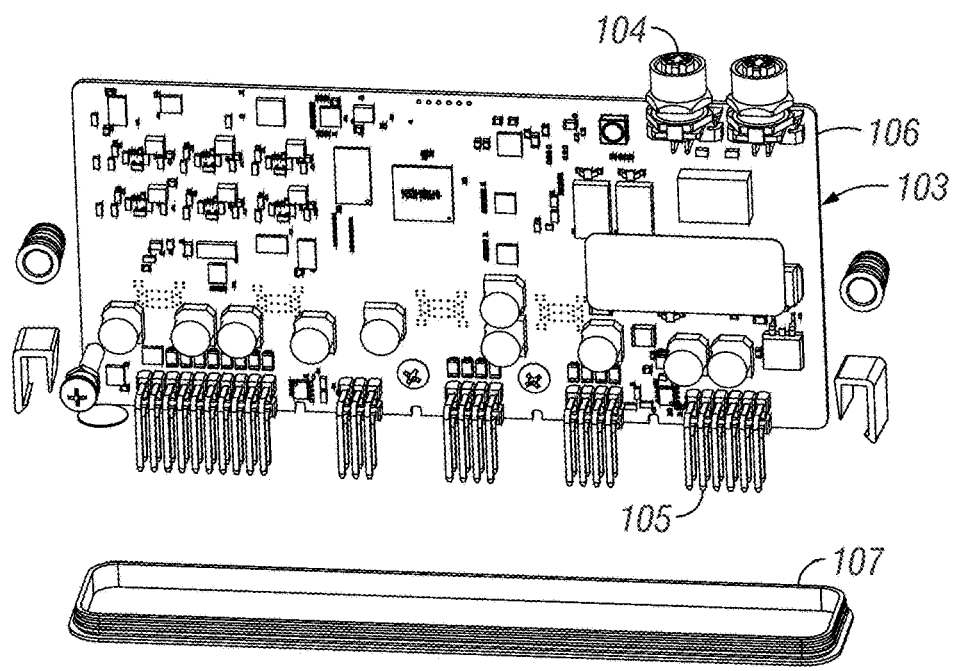

Referring back to FIG. 1, the planter 10, used for exemplary purposes, is an agricultural implement used to plant and fertilize seed in a controlled manner. A planter such as that shown in FIG. 10 may be similar to that disclosed in co-owned U.S. Pat. No. 9,282,691, and/or application Ser. No. 14/478,222, the contents of both of which are hereby incorporated by reference in their entirety. For example, the planter 10 of the disclosure as shown in FIG. 1 includes a tongue 12, which may be a telescoping tongue. The tongue 12 includes a first end 14 with a hitch 16 for attaching to a tow vehicle, such as a tractor 44. The opposite end of the tongue 12 is attached to a frame or toolbar 18. Draft links 20 are connected between the toolbar 18 and the tongue 12 and are used in conjunction with folding actuators 23 to fold the toolbar 18 in a frontward manner. Therefore, the tongue 12 may be a telescoping tongue in that it can extend or track to allow for the front folding of the toolbar 18. The toolbar 18 includes a main or central toolbar 22 and first and second wings 30, 34 extending therefrom. The main toolbar 22 includes central hoppers 24 which contain seed or other granules used with planting. A plurality of transport wheels 28 also are connected to the main toolbar 22. The first and second wings 30, 34 are generally mere images of one another. The wings include first and second toolbars 32, 35. Attached along the main toolbar 22 as well as the first and second toolbar 32, 35, are a plurality of row units 40. The row units include seed meters 42 and/or other components used for planting and fertilizing seed in a controlled manner. Also connected to the first and second wings 30, 34 are first and second marker arms 33, 36. The marker arms include actuators 37 which are used to raise and lower the marker arms. The marker arms can be lowered to provide guidance for the edge of a planter for use in planting. When not required, the markers can be lifted to a position as that shown in FIG. 1 to move the markers out of the way.

Also shown in FIG. 1 are a plurality of fans 26 as well as a plurality of wheels 38. The wings may also include actuators 31 to raise and lower or otherwise provide a downward force on the wings. Therefore, as is shown in FIG. 1, there are a multiplicity of components of the planting implement 10. The components may include moving parts, such as the actuators used to move the wings, markers, row units, etc., while also providing additional functions. For example, the fans 26 are used to provide a pressure in the seed meters 42 to aid in adhering seed to a seed disk moving therein. The seed meters may be electrically driven in that a motor, such as a stepper motor, can be used to rotate the seed meters to aid in adhering seed thereto and to provide for dispensing of the seed in a controlled manner for ideal spacing, population, and/or placement. Other features may include actuators or other mechanisms for providing down force to the row units 40. Lights may also be included as part of the planter. Finally, an air seed delivery system may be provided between the central hoppers 24 and any plurality of seed meters 42 on the row units 40 in that the air seed delivery system provides a continued flow of seed to the row units on an as needed manner to allow for the continuous planting of the seed via the seed meters on the row units. Thus, the various controls of the planter may require or otherwise be aided by the use of a control system. The control system can aid in controlling each of the functions of the implement or planter 10 so as to allow for the seamless or near seamless operation with the implement, and also provides for the communication and/or transmission of data, status, and other information between the components.

The amount of information being transmitted between the tractor and the components of the planter are ever growing and includes high traffic. Currently, any transmission of the information is done with low bandwidth, poorly defined protocol, and also includes compatibility issues among the various components of the tractor and/or implements. Therefore, issues have emerged, and new type have developed for a system including a high traffic mix, low latency, high security, high reliability, high throughput, common supply chain, and highly rugged system to allow for the operation of the implement and to aid in controlling the various components on or associated with the implement. Therefore, as well be understood, the present disclosure provides for solutions to meet said emerging requirements, which can include ruggedization and/or input/output (I/O) complements. The solution has been developed with standard protocols and components with adjacent opportunities in mind. The result becomes an intelligent internet of things based solution supporting a unique complement of functions and input/output features.

Figure 2:
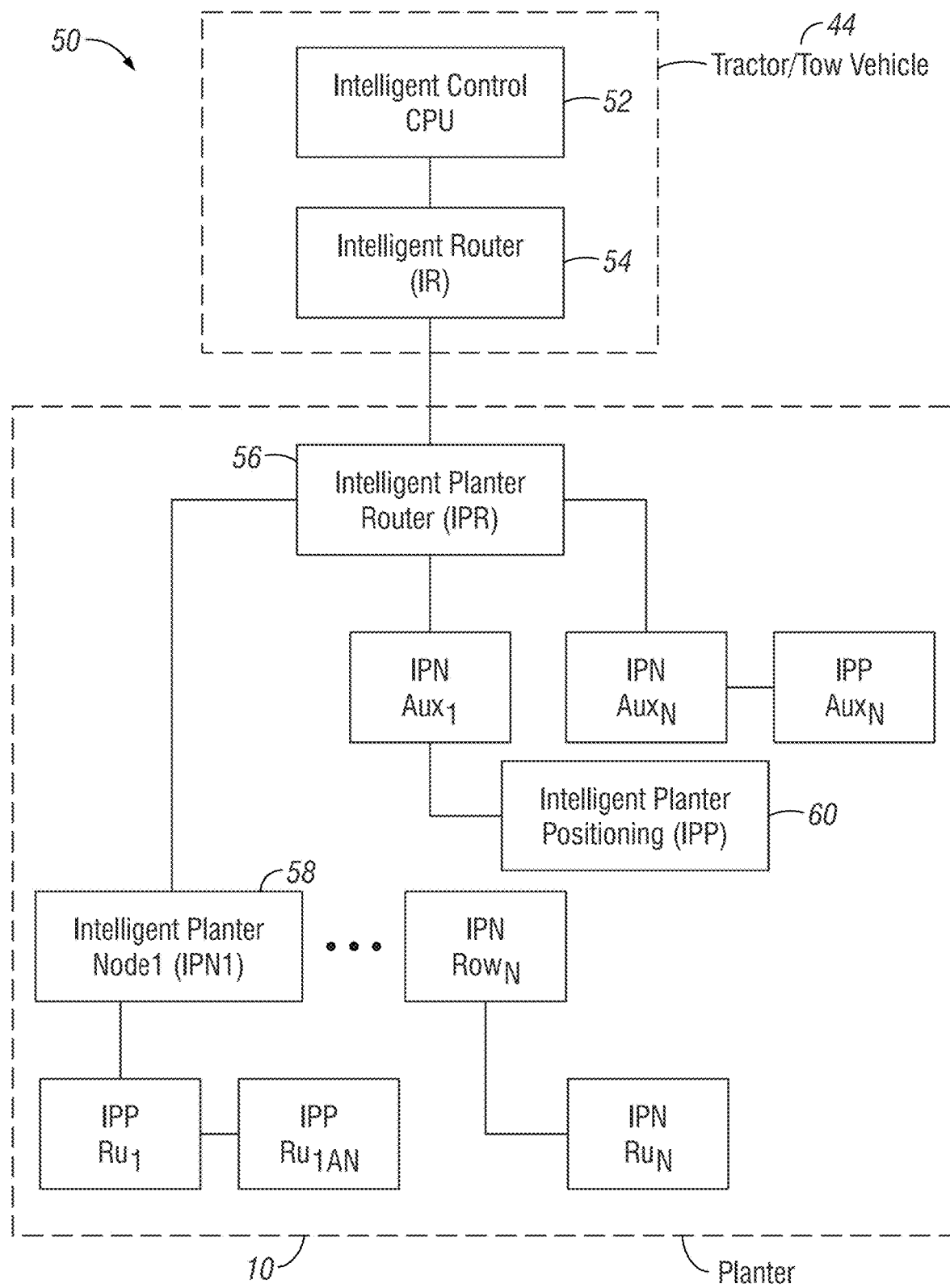
FIG. 2 is a schematic of a system related to the operation of an agricultural implement.

Therefore, FIG. 2 discloses an implement control system 50 according to aspects of the present disclosure. As is shown in the figure, some components of the control system 50 may be included not on the implement itself. For example, the control system as shown in the figure includes an intelligent control 52 which could be a CPU based component such as a user display, which can be an interactive and/or graphical user display. Examples of such intelligent control units may be tablets, telephones, handheld devices, laptops, user displays, or generally any other computing device capable of allowing input, providing options, and showing output of electronic functions. Still further examples include a microprocessor, a microcontroller, or another suitable programmable device) and a memory. The controller also can include other components and can be implemented partially or entirely on a semiconductor (e.g., a field-programmable gate array ("FPGA")) chip, such as a chip developed through a register transfer level ("RTL") design process. The memory includes, in some embodiments, a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. An example of a user interface based on a tablet, which may be known as a planter advanced computing tablet is shown and described in co-owned and U.S. application No. 62/428,725, which is hereby incorporated by reference in its entirety. The intelligent control 52 may be attached to or otherwise associated with an intelligent router unit 54. The intelligent router unit 54 can be included, but is not required in all instances. For example, when the intelligent control 52 is a tablet, it may not include the desired number of connections, inputs, and/or output capabilities. Therefore, the intelligent router 54 can be included to connect to the intelligent control 52 to provide additional inputs, outputs, and/or other connectivity to the intelligent control 52. The intelligent control 52 and/or intelligent router 54 can be remote of an implement, such as a planter 10. As shown in FIG. 2, the combination of the intelligent control 52 and intelligent router 54 are shown to be in the tractor 44 or other tow vehicle. When the control unit is a tablet, the member can be positioned within the cab of a tractor to allow for the input and output to be shown on a display therein, such that an operator can view and interact with said display while in the tractor. However, it is to be appreciated that the control unit can be used generally anywhere remote of the planting implement.

Such a display can include a display (e.g., a primary display, a secondary display, etc.) and input devices (e.g., touch-screen displays, a plurality of knobs, dials, switches, buttons, etc.). More specifically, the display can be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or a reflective bistable cholesteric display (i.e., e-paper).

FIG. 2 also shows components of the implement control system 50, which may be shown as part of the planter 10 or other implement. For example, some components may include an intelligent planter router "IPR" 56, which may be generically referred to as an intelligent implement router or just intelligent router member 56. The intelligent planter router 56 may also be referred to as a planter personality module. The intelligent planter router 56, as will be disclosed herein, provides for programmability to the planter, while also providing for connectivity to components and controls for various aspects of the planter. For example, the intelligent planter router 56 can include an intelligent control feature or member (central processing unit or the like) which can be programmed to provide information related to the planter 10. This can include the number of rows on a planter, type of planter, type of pressure for the seed meters, type of seed meters, number of seed meters, and generally any other information associated with the planter such that the information may be utilized to operate the functionality of the planter. Such programming of the IPR 56 can be done during manufacture of the planter, such as building thereof. Therefore, the IPR 56 can be programmed on an as-built basis to provide such information that can be transmitted with the other components of the implement control system 50. However, the configuration of the IPR 56 will provide information embedded in the CPU thereof during manufacture to provide options and settings for interaction with the other components of the control system 50. The IPR 56 can be connected to a plurality of intelligent planter nodes 58 which may be generically referred to as intelligent nodes or otherwise intelligent implement nodes.

The intelligent planter nodes (IPN) 58 can be used both for at the row units of a planter and/or for axillary functions of the planter. As shown in FIG. 2, the IPN 58 can be positioned at each row unit of the planter such that an IPN can be broken down by IPN row one, IPN row two all the way and up to IPN row N, wherein it is equal to the number of row units associated with the planter. Likewise, when the IPN 58 is used with an axillary function of the planter, the number of IPN's associated with the planter can be determined based on the number of axillary functions associated with the planter itself.

Still further, the implement control system 58 as shown in FIG. 2 includes a plurality of intelligent planter positioning members 60, which may also be referred to generically as intelligent positioning members or intelligent implement positioning members. The intelligent planter positioning (IPP) 60, as will be disclosed herein can be utilized with each of the nodes or with any number of functions or components of the planter 10 to provide for additional information associated with the components. This can include the movement, location, or other data that can be collected via the IPP 60 that can be utilized and transmitted to the various components of the control system, such as the user display of the intelligent control 52.

Figure 3:
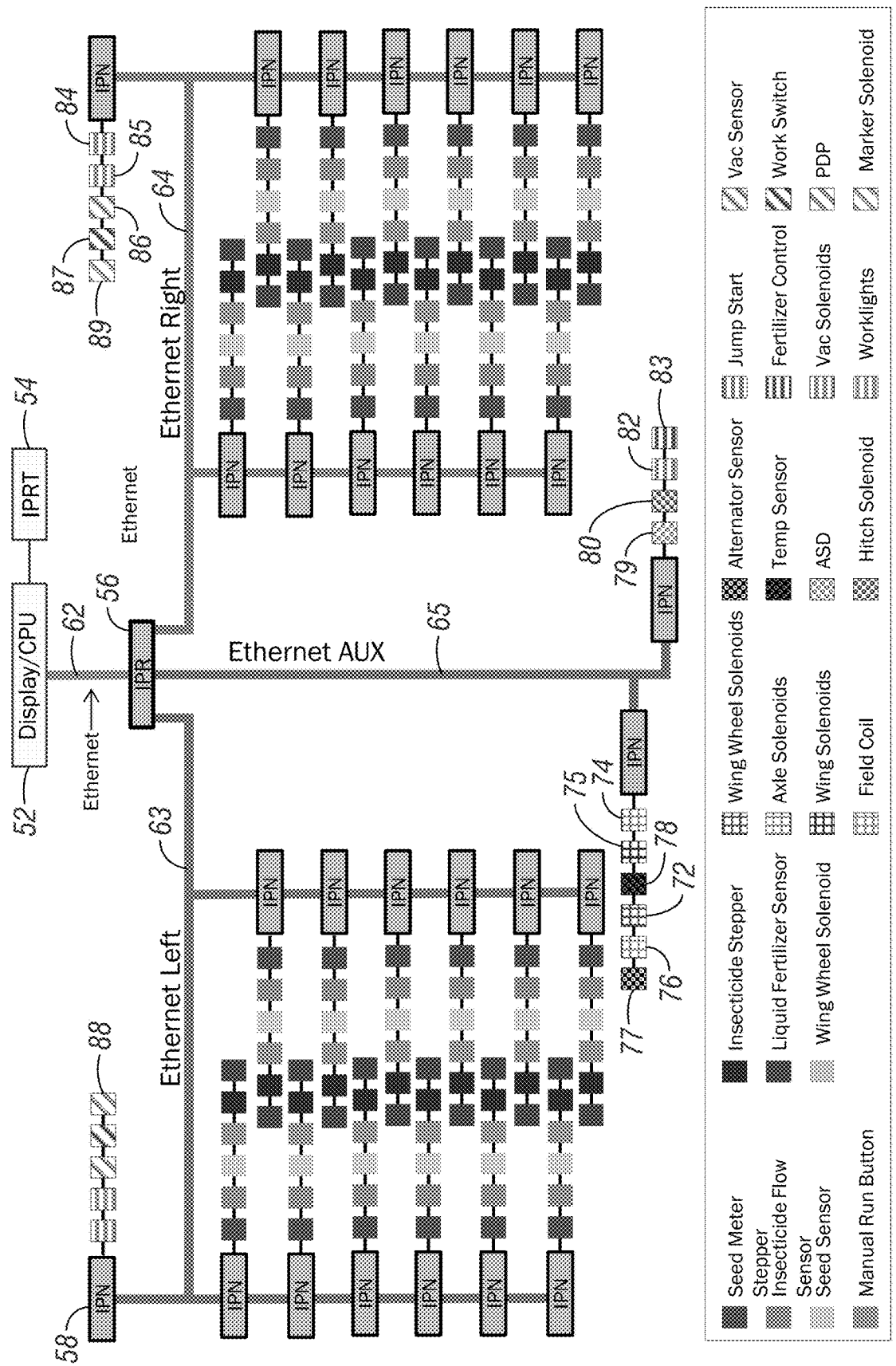
FIG. 3 is another schematic showing a control system for an agricultural implement.

FIG. 3 shows another schematic of the implement control system 50 according to aspects of the present disclosure. The schematic shown in FIG. 3 is similar to that shown and described in FIG. 2. For example, the system 50 shown in FIG. 3 includes a display/CPU member 52 which can be connected to an IPR 54. An Ethernet connection 62 can be utilized to connect the display 52 to the implement IPR 56. The use of Ethernet connection allows for high speed, high band width transmission of information between the components. Ethernet protocol allows for high speed, high speed bandwidth wherein a large amount of data can be transmitted between two components connected via the Ethernet connection in a manner that has not to date been realized in the agricultural industry. Therefore, the use of the Ethernet in the control system 50 provides for a much greater transmission in communication of data in a high-speed manner. The IPR is shown to have three Ethernet connections extending therefrom. These include an Ethernet left 63, and Ethernet right 64 and Ethernet axillary 65. The Ethernet left 63 connections is showing the Ethernet connection to the left wing of a planter 10, and is shown to be connected to a number of IPN's 58 which are associated with the row units 40 attached to and or on the left wing of the planter. Similarly, the Ethernet right connection 64 is connected to a plurality of IPN's that are associated with a number of row units attached or associated with a right wing of the planter 10. However, it should be appreciated that the number of IPN's utilized and the delegation of the right and left are for exemplary purposes only, and are should not be limiting to the present disclosure. Finally, the Ethernet axillary connection 65 is connecting the IPR 56 to a plurality of IPN's 58 associated with axillary functions of the planter 10. While two IPN's are connected via the Ethernet axillary, it is to be appreciated that this is for exemplary purposes only, and is not to be limiting on the present disclosure either.

Therefore, for exemplary purposes, the Ethernet left connection 63 associated with the IPN's 58 can be described thusly. The IPN's are connected to a number of sensors, motors, and other controls in which the IPN's transmit information between each other and the IPR in order to control functions of the components thereon. For example, one IPN is connected to a seed meter motor 66, insecticide flow center 67, seed sensor 68, manual run button 69, insecticide motor control 70, and liquid fertilizer sensor 71. Such motor and sensors are generally associated with a row unit and/or seed meter of a planter. Therefore, the IPN is connected to the components and operates with the IPR 56 in order to control the functionality of the various components. Likewise, a different IPN connected to the Ethernet left connection 63 includes connection to vacuum solenoids, work lights, vacuum sensors, work switches, and marker solenoids. These are also functions associated with the wing and control of components thereon. Therefore, the additional IPN will include connections and control of the functions associated with these components. The Ethernet axillary connection 65 is shown to be connected to additional components. For example, the IPN's associated with the Ethernet axillary connection 65 include components of wing wheel solenoids 72, axle solenoids 74, wing solenoids 75, field coils 76, alternator sensors 77, temperature sensors 78, air seed delivery controls 79, hitch solenoids 80, jump start controls 82 and fertilizer controls 83. Such controls, sensors, and the like are associated with other aspects of the planter and control thereof. This allows for the use of the planter and the acquisition of data associated with the varying controls.

Therefore, the IPN's are in communication with the IPR to provide the controls for the associated components of the IPNs. This will allow for the control of the planter in a higher speed and higher ban with manner, such that the controls will be passing a higher amount of data between the IPN's and the IPR. Furthermore, the use of the implement control system 50 as shown and described will provide additional benefits and improvements. Such benefits may include a type of plug-n-play system. Currently, each row unit includes a node or control board that is specifically programmed for the location of the row unit in relation to the planter, type of seed meter used with the planter and other factors in which the node is specifically tailored to and tied down to a specific location. Aspects of the present disclosure allow for the IPN's 58 to be near universal and function to allow for the IPN to be connected to an IPR 56 in which the IPN will then become programmed to provide any number of functional capabilities. These functional capabilities can then be transmitted to the user display 52 to allow for an operator to interact with the IPN on how it should act, react or otherwise function in relation to the other components of the implement control system 50.

For example, the IPR 56 can be programmed during manufacture, as previously disclosed. This can include information related to the planter, such as number of row units type of seed delivery mechanism, type of down force providing, type of pressure to the seed meters, and/or any other factors that can be varied according to a planting implement. The IPN's can be attached to the planter wherein the IPR can transmit this information to the IPN via the high speed, high bandwidth Ethernet connections to provide information related to the planter to the IPN. The IPN can then recognize other components connected thereto and can provide functional options to an operator via the user display to allow for the operator to input desired outcomes, controls, parameters, or other inputs to allow the IPN to actively control components connected thereto based on said inputs. This quick plug-n-play style programming allows for the IPN's to be essentially un-programmed until connected to an IPR number. The blank programming of the IPN will allow for the quick association of the IPN with components connected thereto to allow for the control of said components regardless of any preprogramming. This is advantageous in that it saves time, cost, and other problems associated with specifically programming a control board with the functionality of components that it will be attached to.

Figure 4:
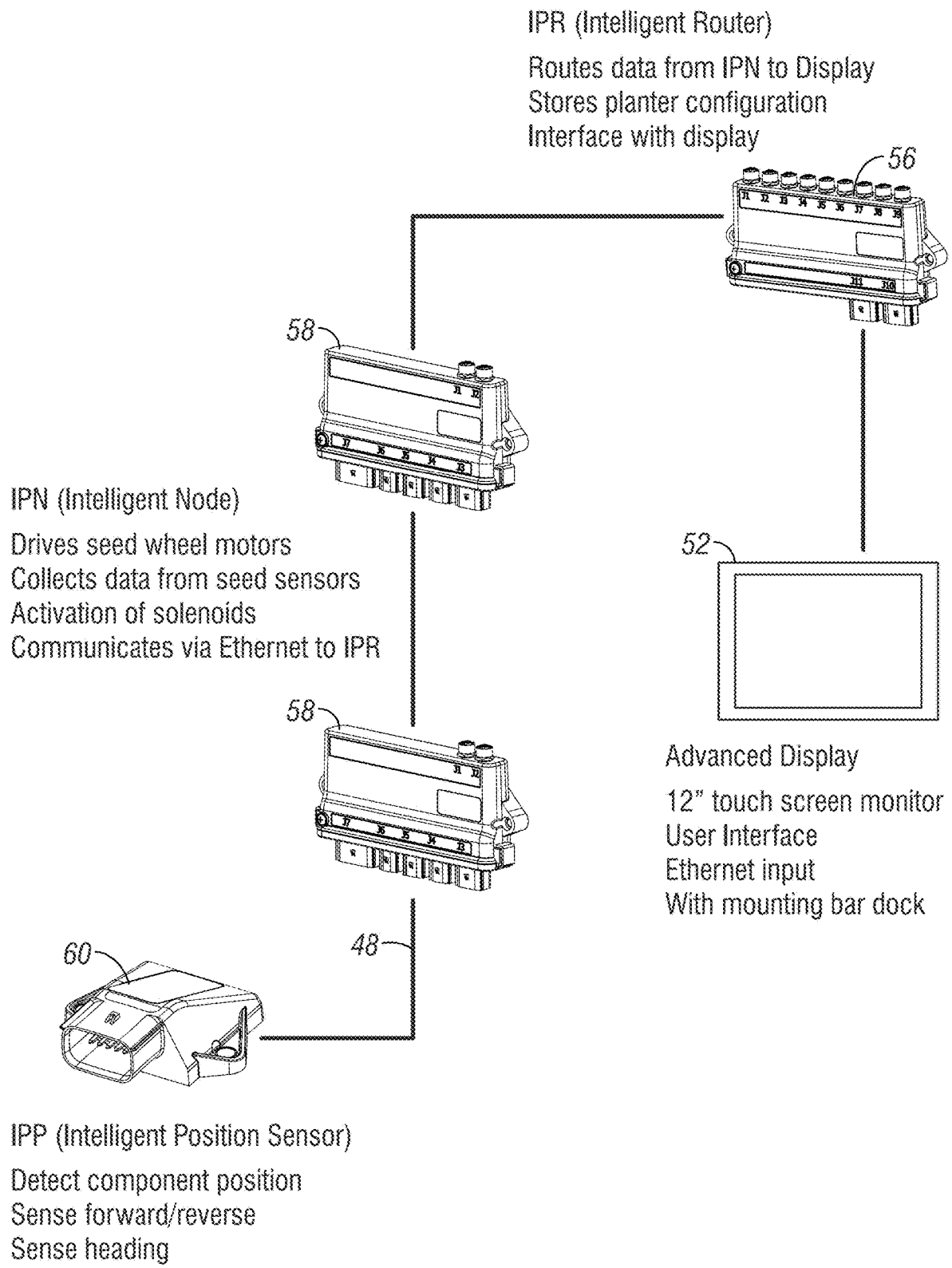
FIG. 4 is a diagram showing components of a control system for an agricultural implement according to aspects of the disclosure.

FIG. 4 shows another diagram of the implement control system explaining some of the components thereof. As disclosed, a display unit or other control unit 52 can take the form of a tablet, monitor, user interface, or other computing device. As shown in FIG. 4, the display can be a touch screen monitor providing a user interface with inputs and outputs and having an Ethernet input with a mounting bar dock. As mentioned, if the required input and outputs are not associated with a display unit 52, an IPR or other routing mechanism that does include the desired input and output connectivity can be associated with the display unit 52. The display unit 52 is connected via Ethernet connection 62 to an IPR 56. According to aspects of the disclosure, at least one, or one or more IPRs may be used with each planter. For example, one IPR may be used with a planter according to some embodiments. However, additional embodiments include a planter with more than one IPR 56, such as two, three, or more. IPR route data from an IPN 58 to the display, stores planter configuration information, interfaces with the display, and can provide other controlling or otherwise be the brain function of an implement. Connected to the IPR via Ethernet connection is a plurality of IPN's 58. The IPN's are connected to components of a planter or other mechanism to control said components. For example, the IPN's 58, one connected to a planter, can drive seed motors, collect data from seed sensors, activate solenoids, and or otherwise communicate with the IPR via Ethernet connection. Also shown in the diagram of FIG. 4 is a IPP 60. A plurality of IPP 60 can be positioned throughout the planter to provide positioning data for the planter and components thereof. The IPP 60 can detect component position, sense forward and reverse direction, and otherwise sense heading of the planter and/or components thereof. For example, when an IPP is positioned on a marker arm, the information collected by the IPP can provide substantially exact location of the marker arm between a stored and a use configuration. This is highly advantageous over the current setting which and only allows knowledge or information that the marker arm is being lowered or raised, but does not show exact configuration thereof. The IPP can also collect additional information and be an inertial unit that can provide highly accurate location information such that the data can be collected during planting to provide location information related with an event. Such information can be associated with the planting of a seed, the location of an obstacle, the location of start and ending, and generally any other location or directional information that may be associated with an event.

Figure 5:
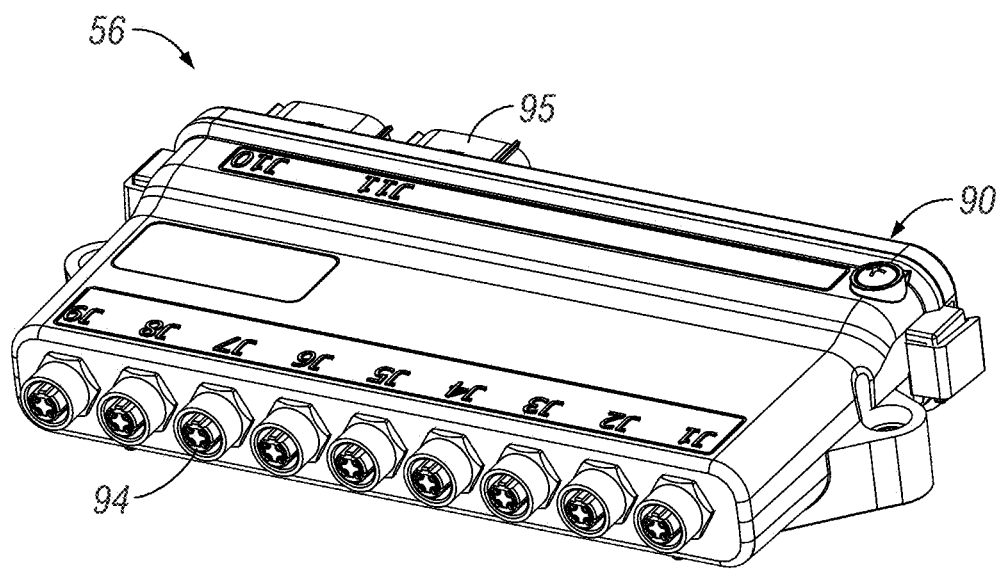
FIG. 5 is a perspective view of an intelligent implement router (IIR) according to aspects of the disclosure.
Figure 6:
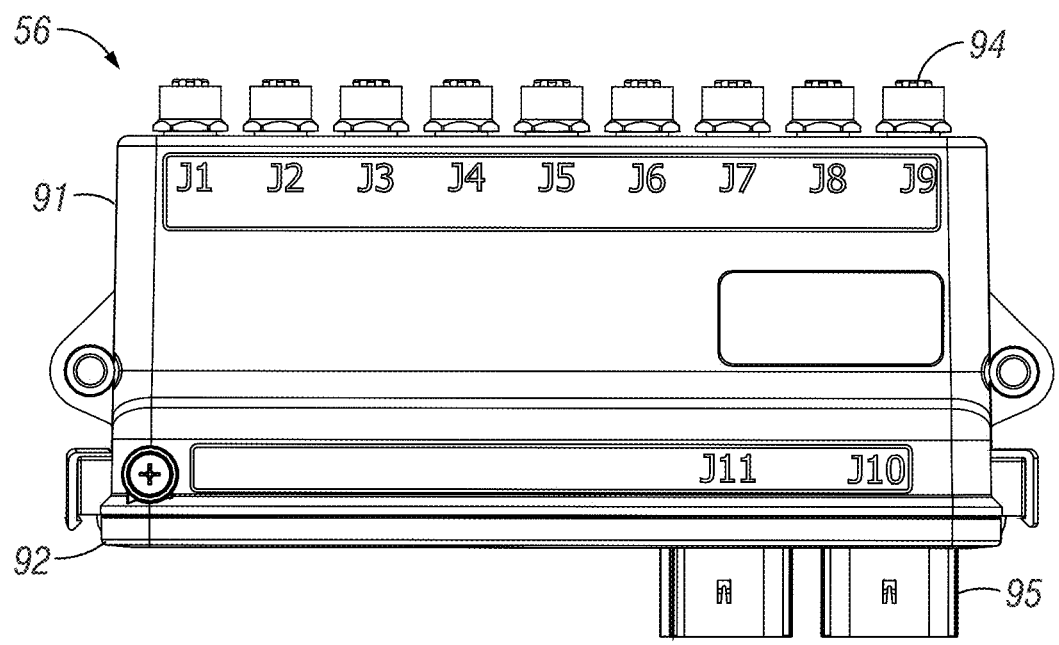
FIG. 6 is a front elevation view of the IIR of FIG. 5.
Figure 7:
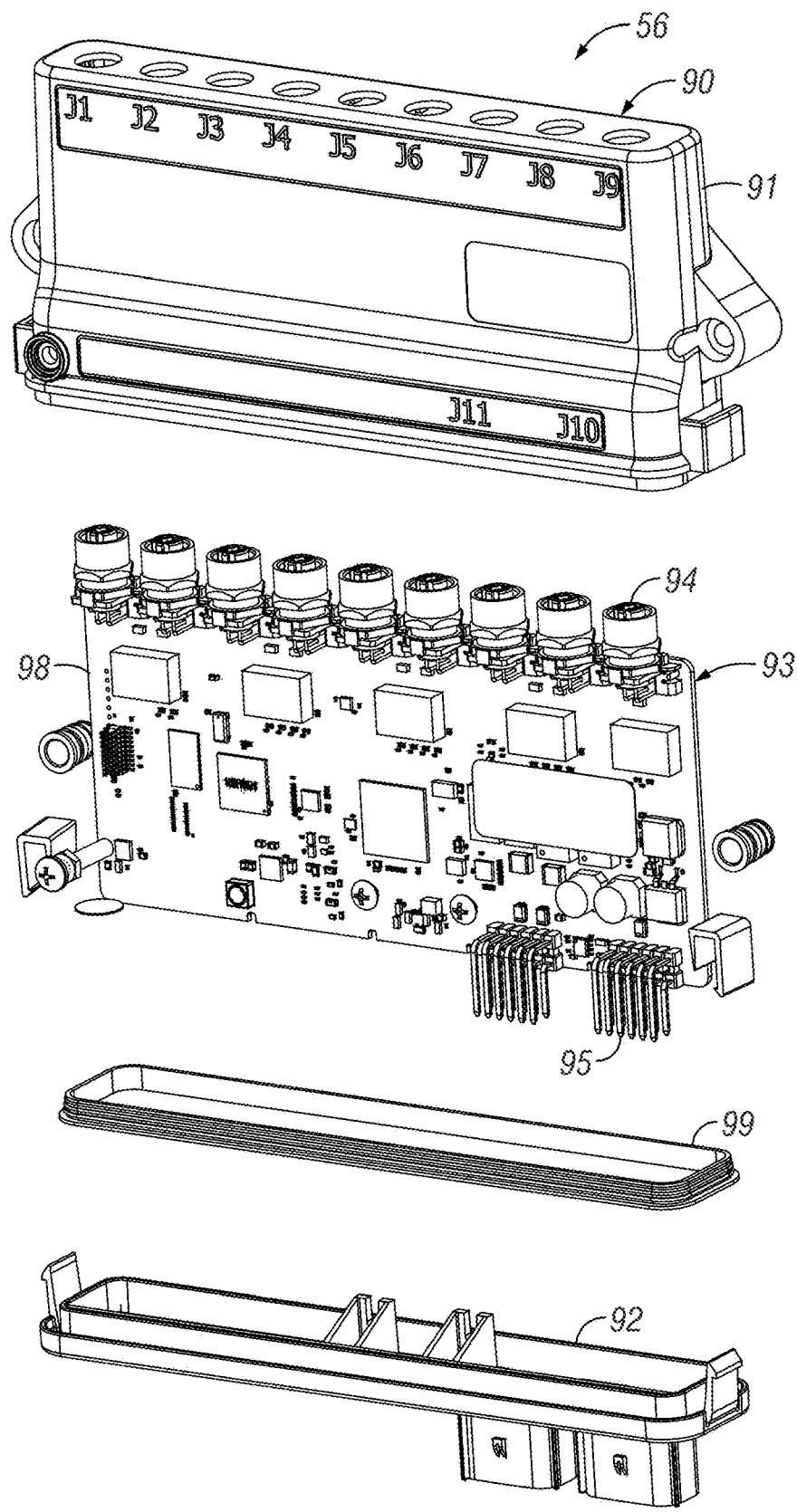
FIG. 7 is an exploded view of the IIR of FIG. 5.
Figure 8:
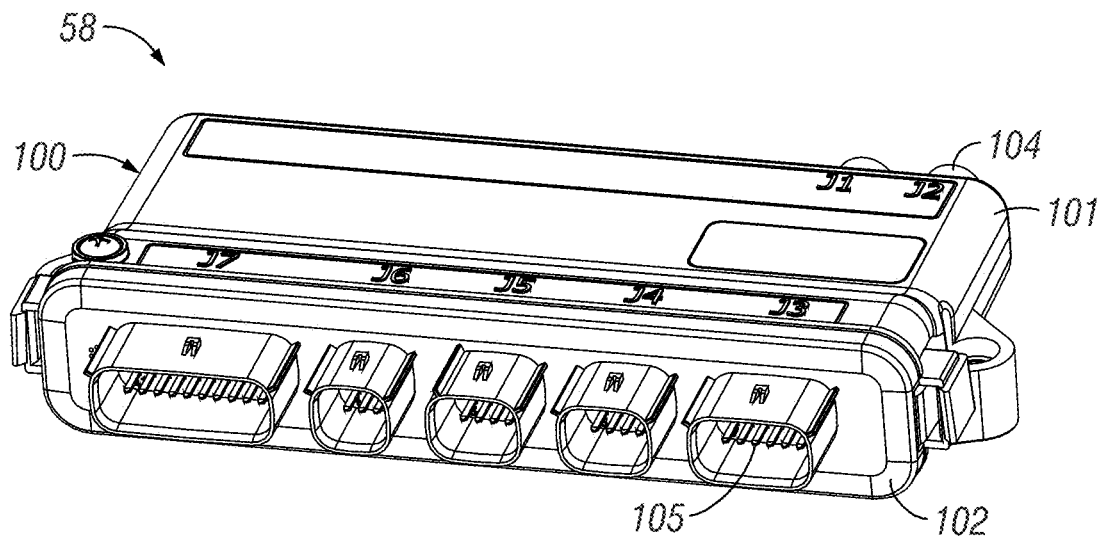
FIG. 8 is a perspective view of an intelligent implement node (IIN).
Figure 9:
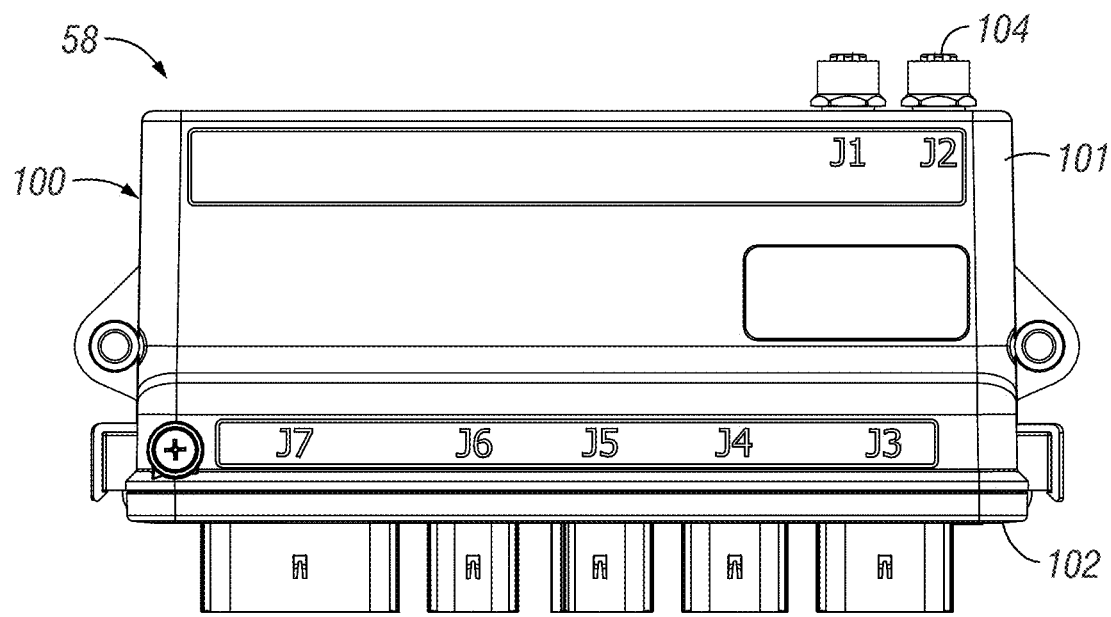
FIG. 9 is a front elevation view of the IIN.

FIGS. 5-7 disclose views of an IPR according to aspects of the present disclosure. The IPR provides reliable and robust routing for Ethernet devices on a network. The IPR 56 includes a housing 90 for providing protection to the internal components of the IPR 56 such that the IPR can be used in a variety of locations with limited damage thereto. The housing 90 as shown in the figures includes a first section 91 and a second section 92 connected to one another. A gasket 99 is shown to be positioned there between to provide for a sealing of the housing 90. The sealing of the housing is rated to IP 67, which is a certification rating meaning it is fully protected from dust and can withstand being submerged in approximately 1-meter of water. According to some aspects, the housing can comprise nylon reinforced polymer. However, this is not to be limiting thereto. As shown in FIG. 7, the internal components or body 93 of the IPR includes a number of connections and control components. A CPU of the IPR can be a Sitara Cortex A8 processing unit for providing the processing of the IPR. The connections shown in the figures include a plurality of Ethernet connectors 94, which are shown to be 9 in the figures. However, the number is not to be limiting thereto. Other connections include CAN bus connectors 95 which can be connected to external components. The operating system can be a Linux based system, but is not to be restricted thereto. The IPR therefore, as shown in the figures, is a 9 port, layer 2, 10/100 rugged Ethernet smart switch. With unmanaged or managed configurations, an optional din-rail mounting, the IPR is an improved industrial Ethernet routing control component. The IPR can include RS232 and/or USB client port communications, and can include additional connectors, such as digital outputs, analog digital frequency modes, hardware strapping, and other variations as will be appreciated. Communications available via the IPR include, but are not limited to:

Ethernet: 9×10013a eT via M12 connector
    2× CAN bus: Supports CAN 2.0A/2.0B protocol
    1× RS232
    1× USB client port FIGS. 8-11 show various views of an IPN 58, including an exploded view in FIG. 10. The IPN provides control and data communication for sensors, motors, cameras, lights, and any other device on a network. The IPN is a compact, ruggedized computer based on Linus ARM Architecture, with reliable and flexible I/O. Ethernet connectivity allows for simple and fast integration for generally any environment. A simply to use software interface means easy setup for any application. The IPN 58 includes a housing 100. The housing 100 can be separated into first and second housing numbers 101 and 102. Similar to the IPR, the housing 100 of the IBN can be nylon reinforced polymer. The components of the housing can also include a gasket 107 to provide IP 67 sealing of the housing. A Sitara Cortex A8 CPU can also be included and be Linux based operating system. The IPN provides control and data communication for sensors, motors, cameras, lights, and any other device that may be utilized on a network. To provide such control and communication, the IPN 58 can include a plurality of Ethernet connections 104, as well as a number of other connections 105. Such other connections can include CAN bus connections, local inner network connections, RS232 connections, as well as any other analog and/or digital connections. The following connectors are capable for use with the IPN:

Up to 4× PWM 0-24V Output
    Up to 4× Stepper Motor Controllers
    Up to 6×5V/12V digital outputs
    8× Configurable 0-12V Inputs:
        Configurable pull-up/pull-down
        Analog/digital/frequency modes
    Addressable-hardware strapping Likewise, the following communications are available:

Ethernet: 2×100 Base T via M12 connector
    CAN BUS: Support CAN 2.0A/2.0B protocol
    LIN (Local interconnect Network)
    1× RS232

Figure 11:
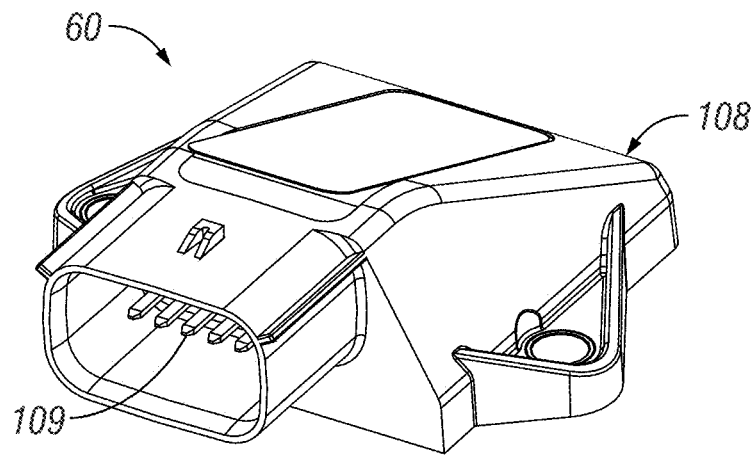
FIG. 11 is a perspective view of an intelligent implement positioning member (IIP) according to aspects of the disclosure.
Figure 12:
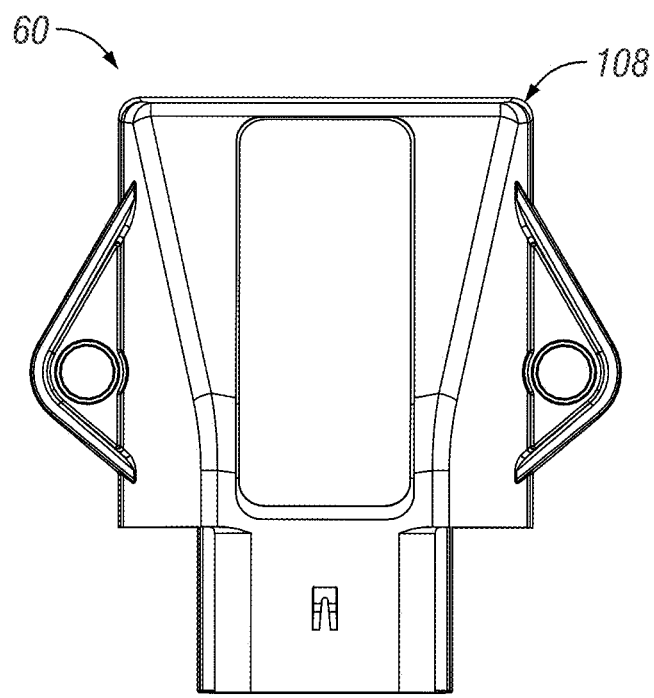
FIG. 12 is a front elevation view of the IIP.

FIGS. 11 and 12 provide views of an intelligent planter positioning or IIP member 60. The IIP 60 includes a housing 108 with at least one connector 109 for connecting to a way to transmit data between the IIP and an IPN. The IIP provides positional monitoring for a network and/or a component thereof. The communication can be a CAN communication for providing sensoral or sensor information and can be used to track movement, track movement of robotic arms, door positioning monitoring, level sensing, monitoring acceleration, and/or other antimony based systems. It is a member that provides 9 degrees of freedom data, is compact, lightweight and rugged, and can be designed and cabled for optimal remote placement. The communication of the data acquire via the IIP can be communicated via industry standard CAN networks and can be powered via 12-volt power source. The housing 108 can comprise nylon reinforced polymer. The 9 degrees of freedom processor, according to some aspects, can be a Bosch BNO055 member that includes absolute orientation that integrates accelerometer, gyroscope, and magnetometers. Gyroscope data, that measures the rate of rotation and space (roll, pitch, yaw). Accelerometer data, which detects linear motion and gravitational force. Also, the processor provides a magnetometer information, which measures the terrestrial earth's magnetic fields. The software of the device intelligently fuses raw data from multiple sensors. The CAN bus activity between the IIP and the IPN is an industry standard for transmitting the sensor data.

While wired connections, such as Ethernet, CAN bus, etc., have been disclosed herein, it is also to be appreciated that wireless networks, communications, transmissions, and the like are to be considered part of the disclosure. The network can be a local area network ("LAN"), a neighborhood area network ("NAN"), a home area network ("HAN"), or personal area network ("PAN") employing any of a variety of communications protocols, such as Wi-Fi, Bluetooth, ZigBee, near field communication ("NFC"), etc., although other types of networks are possible and are contemplated herein. Communications through the network by a communications module or a controller can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), and the like.

Therefore, the components of the implement control system allow for the acquisition of data, as well as the high speed and high bandwidth communication and/or transmission of the data between the various components to allow for the control of multiple components of the implement, such as a planter. Such data can be quite large, such as collecting the exact or near exact positioning of a planter or a component thereof via the IIP, and therefore the Ethernet connectivity between the components provide for the ability to transmit the data between the components in a high-speed manner such that the data can be used on a real-time basis. Furthermore, such data can be transmitted to the display or central processing unit 52, where it can be transmitted to a cloud or other database for storage of the data. Such data can be utilized for future purposes, such as creating prescription field mapping, and/or other information related to the use of the equipment which can then be analyzed in relation to a future event, such as harvesting and yield output of the seed that has been planted.

It is further envisioned that the IIR, IIN, IIP, and other components disclosed herein and shown in the accompanying figures may be used for non-agricultural operations, systems, methods, and/or apparatus. For example, it should be apparent that the components shown and described herein provide numerous advantages and include improvements over any number of systems including one or more electrical or electronic components that may communicate with one another and/or a master module.

Therefore, it is contemplated that the aspects of the disclosure be used with and/or in any number of electric systems. Such number of end uses and applications may be considered numerous enough that it would not suffice to include any exemplary, and therefore, any such system can be described generically. One skilled will appreciate the implementation of the components into such system that show how the components cover such systems.

Figure 13:
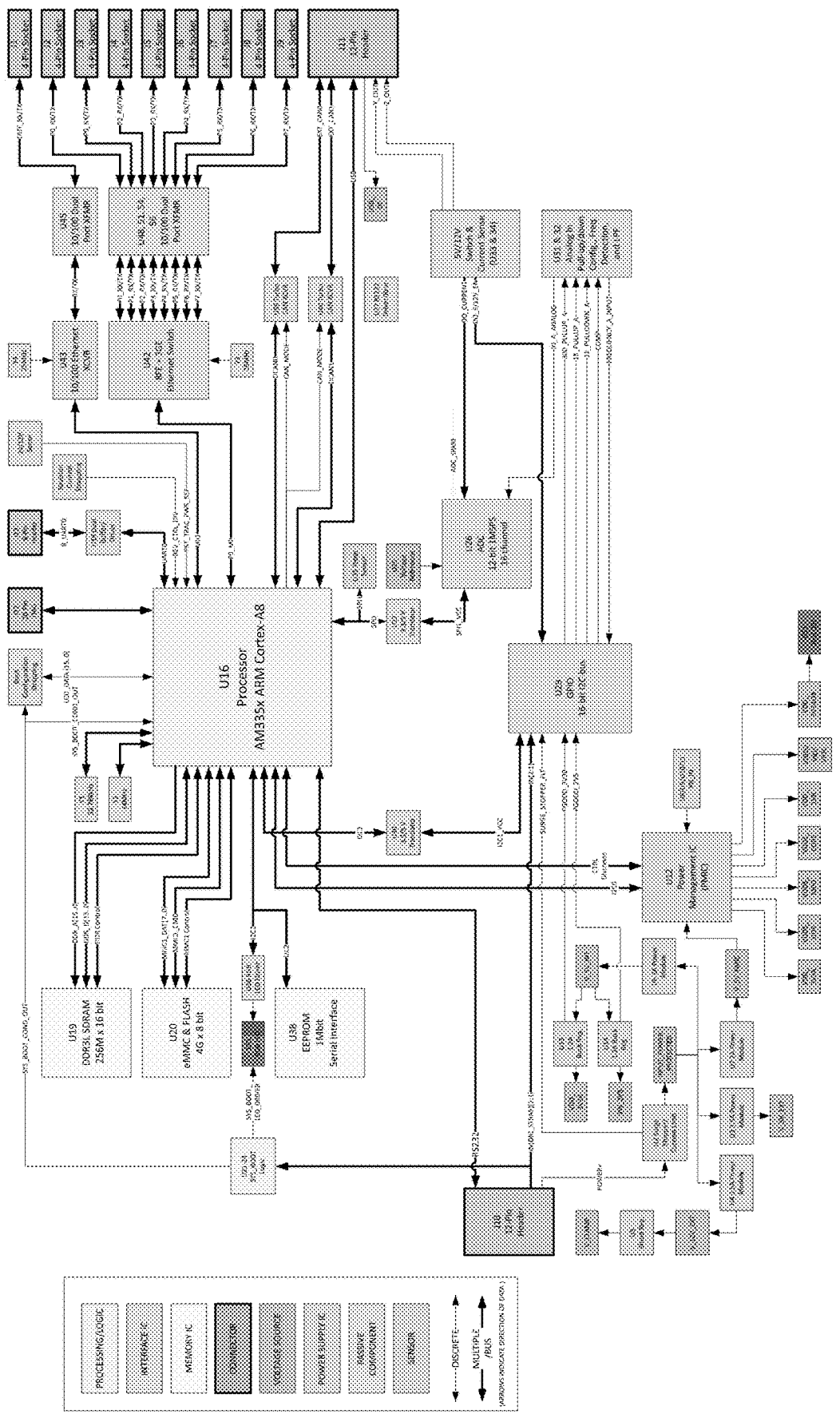
FIG. 13 is a block diagram showing the architecture of an IIR according to aspects of the disclosure.
Figure 14:
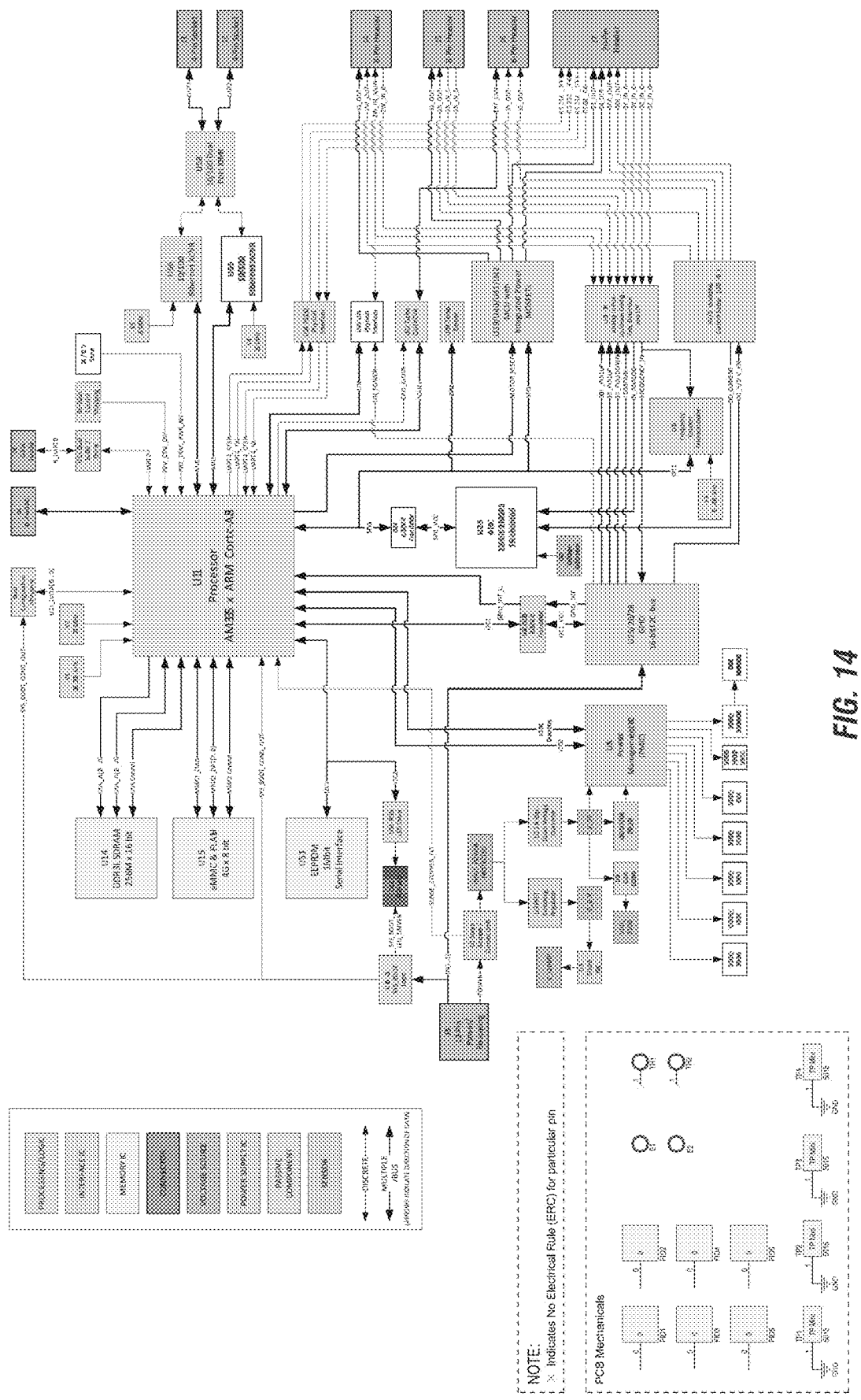
FIG. 14 is a block diagram showing the architecture of an IIN according to aspects of the disclosure.
Figure 15:
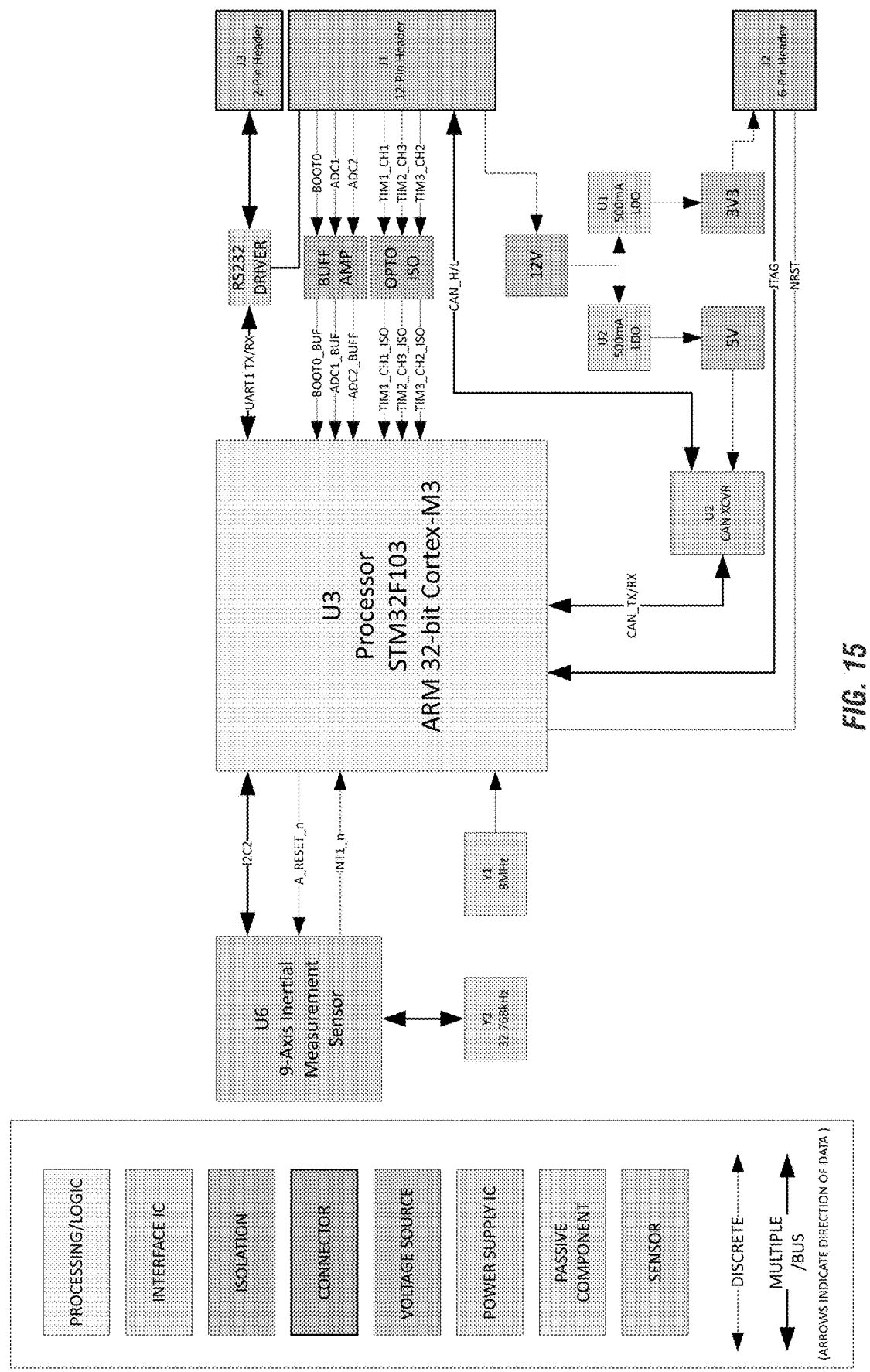
FIG. 15 is a block diagram showing the architecture of an IIP according to aspects of the disclosure.

FIGS. 13-15 disclose diagrams and/or schematics of generic (i.e., non-agriculturally programmed) components still referenced as IIRs, IINs, and IIPs. As is shown in FIG. 13, an IIR includes numerous components, which may be broken down generically into Processing/Logic (e.g., Processor, shown to be a AM335x ARM Cortex-A8, from Texas Instruments), Interfaces (e.g., analog-to-digital converters, input/outputs, ethernet switches, buffers, drivers, other switches, CANs, etc.), Memory (e.g., DDR3L SDRAM, eMMMC & FLASH, EEPROM, etc.), Connectors (e.g., 12-pin, 4-pin, 20-pin, headers, sockets, JTAGs, etc.), Voltage Sources, Power Supply (e.g., Power Management IC, power modules, etc.), Passive Components (transformers, etc.), and Sensors (temperature and the like). As shown in the Figure, there are also a number of discrete and/or multiple/BUS connections. Still further, there is an RGB LED with a driver. These are but just some of the components of an IIR, which shows some of the capabilities of such a component in a greater system.

FIG. 14 shows a diagram/schematic of an TIN, in a generic manner. The components includes many features and subcomponents, including, but not limited to, Processing/Logic (e.g., Processor, shown to be a AM335x ARM Cortex-A8, from Texas Instruments), Interfaces (e.g., analog-to-digital converters, input/outputs, ethernet switches, buffers, drivers, other switches, CANs, etc.), Memory (e.g., DDR3L SDRAM, eMMMC & FLASH, EEPROM, etc.), Connectors (e.g., 12-pin, 4-pin, 20-pin, headers, sockets, JTAGs, etc.), Voltage Sources, Power Supply (e.g., Power Management IC, power modules, etc.), Passive Components (transformers, etc.), and Sensors (temperature and the like). As shown in the Figure, there are also a number of discrete and/or multiple/BUS connections. Still further, there is an RGB LED with a driver.

FIG. 15 shows a diagram/schematic of an IIP, in generic form. The components include many features and subcomponents, including, but not limited to, Processing/Logic (e.g., Processor, shown to be an ARM 32-bit Cortex-M3, from Texas Instruments), Interfaces (e.g., drivers, other switches, CANs, etc.), Isolation, Connectors (e.g., 12-pin, 2-pin, 6-pin, headers, sockets, JTAGs, etc.), Voltage Sources (12V, 5V, 3V), Power Supply, Passive Components (transformers, etc.), and Sensors (9-axis inertial measurement sensor). As shown in the Figure, there are also a number of discrete and/or multiple/BUS connections.

Therefore, it is to be considered that one or more of the IIR, TIN, and/or IIP could be included in a system for operation of one or more electrical components. The IIP, which may be referred to generically as an intelligent position sensor, provides for numerous data points, such as related to the measurements of the 9-axis sensor. The output of the sensor can be directed to an TIN or IIR in order to communicate to the electrical system include one or more components as to one or more functions of the component. This could be changing an output of the electrical component (direction, on/off, speed, display, cylinder operation, angle, height, width, size, pitch, yaw, other angular setup, or the like), or the information could be stored in a memory to be used at a later time, such as to compile the data and/or transform the data points into a more useful output, such as a map, summary, troubleshooting guide, history, or the like. The possibilities are near endless, and provides positional monitoring for the system/network. Examples of potential uses include, but are not limited to, tracking of movement, robotic arms, door position monitoring, level sensing, monitoring acceleration, use with an TIN, autonomous industries, and any other field.

The TIN, which may be generically known as a ruggedized compact computer, could be used with or without the components listed herein to provide for a control module for an electrical/electronic component. Such use could provide for hardwired or wireless connection between the component and the IIN to provide programmable, machine-learnable, or other instructions to the component to provide for operation of the same. Such operation could be based upon programmed instructions, changed no-the-fly or in real time, or could be learned, such as by a machine learnable algorithm to provide for a more efficient operation of the electrical component and/or greater system to which the component and module are incorporated.

For example, the IIN provides control and data communication for sensors, motors, cameras, lights, and generally any other device that is included on an electrical network. It can be implemented in the Internet of Things, and can be used in potential industries (non-limiting) as actuators (hydraulic, pneumatic, electrical, hybrid, etc.) equipment, such as heavy equipment control, industrial automation, refrigeration, remote monitoring and control, entertainment industries, welding, general robotics, energy (e.g., solar, wind, etc.), municipal control, traffic lights and cameras, motor drivers, and any other industry.

The IIR, which may be generically known as a rugged industrial ethernet switch, provides for routing applications on a network/system. Similar to the IIN, the module/router could be used potential industries (non-limiting) as actuators (hydraulic, pneumatic, electrical, hybrid, etc.) equipment, such as heavy equipment control, industrial automation, refrigeration, remote monitoring and control, entertainment industries, welding, general robotics, energy (e.g., solar, wind, etc.), municipal control, traffic lights and cameras, motor drivers, and any other industry.

Therefore, the present disclosure has provided numerous advantages and/or improvements over the current art. The components of the control system allow for the high speed, and high bandwidth transmission in communication between multiple components of a system and also for the acquisition of large amounts of data which that can be transmitted as well to provide for numerous feedback and updated control options based upon the real time acquired data. Various alternatives obvious to those skilled in the art are to be considered part of the present disclosure.

What is claimed is:

1. A method for connecting an electronic component with an agricultural implement configured to perform an agricultural operation, the method comprising the steps of:

providing the electronic component having a component type identifier, said component type identifier including information that identifies the electronic component and information related to the capabilities of the electronic component for performing at least one agricultural operation;

providing a planter having a plurality of row unit slots and a master module, and an electronic link configured to connect to the electronic component to the agricultural implement;

automatically detecting an electronic connection from the electronic component via the electronic link;

transmitting the component type identifier to the master module to identify the connected electronic component and the capabilities of the electronic component for performing at least one agricultural operation;

displaying, on a user interface, the identity and capabilities of the electronic component;

displaying, on a user interface, operating instructions associated with the electronic component based, at least in part, on the component type identifier; and allowing a user to offer inputs based on the operating instructions, via the user interface, to be provided to the electronic component for performing at least one agricultural operation.

2. The method of claim 1, wherein the connected electronic component comprises one of a seed meter assembly and a row unit assembly.

3. The method of claim 2, wherein the connected electronic component is the row unit assembly, and the method further comprising the steps of:
   determining one of the plurality of row unit slots associated with the row unit assembly;
   configuring the row unit assembly to perform a portion of the agricultural operation associated with the one of the plurality of row unit slots.

4. The method of claim 1, wherein the electronic link comprises one of a wired connection or a wireless connection.

5. The method of claim 1, wherein the master module is associated with the electronic user interface.

6. The method of claim 1, wherein the component type identifier is stored as data on the electronic component.

7. The method of claim 3, further comprising the step of determining the operating instructions for the row unit assembly based, at least in part, on a preset map.

8. A system for connecting an electronic component to an agricultural implement, the system comprising:
   an electronic link configured to electronically connect the electronic component and the agricultural implement;
   a component type identifier stored as data associated with the electronic component, said component type identifier including information that identifies the electronic component and information related to the capabilities of the electronic component for performing at least one agricultural operation; and
   a master module configured to:
      (a) detect the presence of the electronic component connected to the agricultural implement;
      (b) identify one or more characteristics of the electronic component based, at least in part, on the component type identifier, wherein the one or more characteristics comprise the capabilities of the electronic component for performing at least one agricultural operation;
      (c) display, on a user interface, the identity and capabilities of the electronic component
      (d) determine operating instructions associated with the electronic component based, at least in part, on the one or more characteristics of the electronic component; and
      (e) display, on the user interface, the operating instructions associated with the electronic component;
      (f) allow a user to offer inputs based on the operating instructions, via the user interface, to be provided to the electronic component via the electronic link for performing at least one agricultural operation.

9. The system of claim 8, wherein the one or more characteristics comprise a type of the electronic component or a location of the electronic component on the agricultural implement.

10. The system of claim 8, wherein the electronic component is a row unit assembly on a planter implement.

11. The system of claim 10, wherein the planter implement includes a plurality of row units each having unique planting parameters; wherein the row unit assembly is operably connected to one of the plurality of row units; wherein the master module, upon detection of the row unit assembly, automatically configures the row unit assembly to perform the unique planting parameters associated with one of the plurality of row units.

12. The system of claim 10, wherein the operating instructions include seed placement data associated with a prescriptive planting map.

13. The system of claim 8, wherein the electronic link comprises one of a wired connection and a wireless connection.

14. The system of claim 10, further comprising:
   measurement sensors associated with the planter and each of the plurality of row units;
   wherein the measurement sensors are configured to synchronize time and location with one another.

15. An agricultural planter with a plurality of electronic components, said agricultural planter comprising:
   a routing member comprising a memory including data associated with the agricultural planter and a plurality of connectors;
   a plurality of nodes electrically coupled to the routing member, each of the plurality of nodes associated with at least one of the electronic components of the agricultural planter;
   wherein the plurality of nodes electronically communicates with the routing member to associate, in real time, the electronic component with the agricultural planter to perform a function based, at least in part, on the data associated with the agricultural planter and stored in the memory of the routing member; and
   wherein the plurality of electronic components each include a component type identifier stored as data associated with the electronic component, said component type identifier including information that identifies the electronic component, information related to the capabilities of the electronic component for performing at least one agricultural operation, and operating instructions associated with the electronic component for performing at least one agricultural operation;
   said component type identifier configured to communicate the identification and capability information via a corresponding node to the routing member, and wherein said node operates the electronic component based upon instructions received from the routing member wherein said instructions are based, at least in part, on inputs offered by a user for performing at least one agricultural operation.

16. The agricultural planter of claim 15, wherein the routing member and the plurality of nodes are hardwired connected.

17. The agricultural planter of claim 15, wherein the routing member and the plurality of nodes are wirelessly connected.

18. The agricultural planter of claim 15, further comprising at least one display electronically connected to the routing member, said display configured to display information related to the plurality of nodes and associated electronic components.

19. The agricultural planter of claim 15, further comprising at least one position sensor electronically connected to at least one of the plurality of nodes, wherein said at least one position sensor provides positional data associated with the agricultural planter.

20. The agricultural planter of claim 19, wherein the at least one position sensor comprises a processor and a 9-axis inertial measurement sensor.

* * * * *